(12) United States Patent
Zhang et al.

(10) Patent No.: US 11,221,859 B2
(45) Date of Patent: Jan. 11, 2022

(54) METHOD AND APPARATUS FOR PRESENTING SCREENSAVER OF APPLICATION PROGRAM, AND MOBILE TERMINAL

(71) Applicant: Beijing Kingsoft Internet Security Software Co., Ltd., Beijing (CN)

(72) Inventors: Kangzong Zhang, Beijing (CN); Yong Luo, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 818 days.

(21) Appl. No.: 16/067,515

(22) PCT Filed: Dec. 12, 2016

(86) PCT No.: PCT/CN2016/109367
§ 371 (c)(1),
(2) Date: Jun. 29, 2018

(87) PCT Pub. No.: WO2017/114142
PCT Pub. Date: Jul. 6, 2017

(65) Prior Publication Data
US 2021/0208903 A1    Jul. 8, 2021

(30) Foreign Application Priority Data
Dec. 30, 2015  (CN) .......................... 201511020695.0

(51) Int. Cl.
*G06F 1/24* (2006.01)
*G06F 9/445* (2018.01)
(Continued)

(52) U.S. Cl.
CPC ............ *G06F 9/44505* (2013.01); *G06F 8/71* (2013.01); *G06F 9/4418* (2013.01); *G06F 9/4411* (2013.01)

(58) Field of Classification Search
CPC ....... G06F 9/44505; G06F 8/71; G06F 9/4418
(Continued)

(56) References Cited

U.S. PATENT DOCUMENTS

| 5,740,549 A | * | 4/1998 | Reilly | ................ G06Q 30/0243 |
| | | | | 705/14.42 |
| 6,807,558 B1 | * | 10/2004 | Hassett | ................... G09F 27/00 |
| | | | | 709/203 |

(Continued)

FOREIGN PATENT DOCUMENTS

| CN | 102393807 A | 3/2012 |
| CN | 103607644 A | 2/2014 |

(Continued)

*Primary Examiner* — Volvick Derose
(74) *Attorney, Agent, or Firm* — Blank Rome LLP (57) ABSTRACT

A method, apparatus, and mobile terminal for presenting a screen saver of an application are disclosed. The method comprises: sending broadcast information by a first application installed on the mobile terminal to other applications when a screen saver is to be activated; obtaining version numbers of the configuration information saved by other applications based on the received broadcast information from other applications; obtaining the latest version of configuration information based on the version number of the configuration information saved by the first application and the received version numbers of the configuration information saved by other applications; determining whether the first application has the highest priority among the first application and other applications based on the priorities of the applications contained in the latest version of configuration information; and if so, presenting the screen saver of the first application. In the embodiment, only one application presents its screen saver on a mobile terminal. The stability of the system is improved.

20 Claims, 4 Drawing Sheets

(51) Int. Cl.
*G06F 8/71* (2018.01)
*G06F 9/4401* (2018.01)

(58) Field of Classification Search
USPC ........................................................ 713/100
See application file for complete search history.

(56) References Cited

U.S. PATENT DOCUMENTS

| | | | |
|---|---|---|---|
| 7,155,713 B1 * | 12/2006 | Burkhardt | G06F 8/65 717/175 |
| 2002/0019855 A1 * | 2/2002 | Sakaguchi | G06Q 30/02 709/218 |
| 2003/0050834 A1 * | 3/2003 | Caplan | H04N 21/47202 705/14.14 |
| 2003/0081621 A1 * | 5/2003 | Godfrey | H04L 63/20 370/400 |
| 2003/0177075 A1 * | 9/2003 | Burke | G06Q 30/0601 705/26.1 |
| 2004/0249768 A1 * | 12/2004 | Kontio | H04W 12/03 705/65 |
| 2007/0277127 A1 * | 11/2007 | Carlson | G06F 9/451 715/867 |
| 2009/0150833 A1 * | 6/2009 | Duncan, Jr. | G06Q 30/02 715/867 |
| 2009/0174531 A1 * | 7/2009 | Ohashi | B41J 29/393 340/10.52 |
| 2009/0282372 A1 * | 11/2009 | Jerding | H04N 21/47202 715/867 |
| 2010/0060789 A1 * | 3/2010 | Aoki | H04N 21/431 348/563 |
| 2010/0205667 A1 * | 8/2010 | Anderson | G06F 21/62 726/19 |
| 2014/0181889 A1 * | 6/2014 | Black | H04L 63/105 726/1 |

FOREIGN PATENT DOCUMENTS

| | | |
|---|---|---|
| CN | 103984483 A | 8/2014 |
| CN | 105653280 A | 6/2016 |
| WO | WO2015130097 A1 | 9/2015 |

\* cited by examiner

METHOD AND APPARATUS FOR PRESENTING SCREENSAVER OF APPLICATION PROGRAM, AND MOBILE TERMINAL

This application is a U.S. National Stage Application of International Application No. PCT/CN2016/109367, filed on Dec. 12, 2016, which claims the priority of a Chinese patent application No. 201511020695.0, filed with the State Intellectual Property Office of PRC on Dec. 30, 2015 and entitled "Method And Apparatus For Presenting Screensaver Of Application Program, And Mobile Terminal", which is incorporated herein by reference in its entirety.

TECHNICAL FIELD

The present application relates to the technical field of the screen saving of a terminal, and in particular to a method, an apparatus and a mobile terminal for presenting a screen saver of an application.

BACKGROUND

With the development of mobile communication technology, mobile terminals support more and more services. At the beginning, mobile terminals only support local applications such as phone calls, messages and the like, but now, mobile terminals can download various applications from the network, which enables the mobile terminals to support more and more services.

Some of the applications installed on a mobile terminal have a screen saver function. An application having the screen saver function may, after installed on the mobile terminal, presents its screen saver on the terminal screen when there is no operation on the mobile terminal within a certain period (such as 5 seconds, 10 seconds, etc.). As more and more applications are installed on the mobile terminal, more than one of the applications may present their screen savers at the same time when screen saver is activated for the mobile terminal, which affects the stability of the system.

SUMMARY

Embodiments of the present application aims to provide a method, an apparatus, and a mobile terminal for presenting a screen saver of an application, so as to present the screen saver of only one application when screen saver is activated for the mobile terminal, and thus improve the stability of the system. The specific technical solutions are as follows.

In a first aspect, the present application provides a method for presenting a screen saver of an application. The method is applicable in a mobile terminal and includes:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and if so, presenting the screen saver of the first application.

Optionally, obtaining the latest version of configuration information based on the version number of the configuration information saved by the first application and the received version numbers of the configuration information saved by other applications, includes:

identifying the latest version number from all the version numbers of the configuration information based on the version number of the configuration information saved by the first application and the received version numbers of the configuration information saved by other applications; and determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Optionally, the broadcast information further contains configuration information, saved by the first application, which contains priority information of each of applications;

obtaining the latest version of configuration information based on the version number of the configuration information saved by the first application and the received version numbers of the configuration information saved by other applications, comprises:

obtaining the latest version of configuration information based on the configuration information saved by the first application and the version number thereof and the received configuration information saved by other applications and the version numbers thereof.

Optionally, presenting the screen saver of the first application includes:

presenting, in a notification bar, a prompt message about whether to turn on the switch for screen saver of the first application, when the switch for screen saver of the first application is in an OFF state; and presenting the screen saver of the first application in response to a selection of the user to turn on the switch for screen saver of the first application.

Optionally, presenting, in a notification bar, a prompt message about whether to turn on the switch for screen saver of the first application includes:

determining whether the user closes a prompt message for turning on the switch for a screen saver of another application within a preset time period; and if not, presenting a prompt message about whether to turn on the switch for screen saver of the first application in the notification bar.

Optionally, the broadcast information further comprises a state of the switch for screen saver of the first application;

determining whether the first application has the highest priority among the first application and other applications based on the priorities of the applications contained in the latest version of configuration information, includes:

identifying an application whose switch for screen saver is in an ON state based on the states of the switches for screen saver of the applications in the broadcast information sent by each of the other applications; and determining whether the first application has the highest priority among the first application and the other applications, whose switches for screen saver are in an ON state, based on the priorities of the applications contained in the latest version of configuration information.

Optionally, the method further includes:

updating the configuration information saved by the first application at a preset time interval.

In a second aspect, the present application provides an apparatus for presenting a screen saver of an application. The apparatus is applicable in a mobile terminal and includes:

a sending module, configured for sending broadcast information by a first application installed on the mobile terminal to other applications when a screen saver is to be activated, wherein the broadcast information contains a version number of configuration information, saved by the first application, which contains priority information of each of applications;

a first obtaining module, configured for obtaining version numbers of the configuration information saved by other applications based on the received broadcast information from other applications;

a second obtaining module, configured for obtaining the latest version of configuration information based on the version number of the configuration information saved by the first application and the received version numbers of the configuration information saved by other applications;

a determination module, configured for determining whether the first application has the highest priority among the first application and other applications based on the priorities of the applications contained in the latest version of configuration information; and a presentation module, configured for presenting the screen saver of the first application if the result from the determination module is positive.

Optionally, the second obtaining module includes:

an identification submodule, configured for identifying the latest version number from all the version numbers of the configuration information based on the version number of the configuration information saved by the first application and the received version numbers of the configuration information saved by other applications; and an obtaining submodule, configured for: determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Optionally, the broadcast information further contains configuration information, saved by the first application, which contains priority information of each of applications;

the second obtaining module is further configured for:

obtaining the latest version of configuration information based on the configuration information saved by the first application and the version number thereof and the received configuration information saved by other applications and the version numbers thereof.

Optionally, the presentation module includes:

a display submodule, configured for presenting, in a notification bar, a prompt message about whether to turn on the switch for screen saver of the first application, when the switch for screen saver of the first application is in an OFF state; and a presentation submodule, configured for presenting the screen saver of the first application in response to a selection of the user to turn on the switch for screen saver of the first application.

Optionally, the display submodule is further configured for:

determining whether the user closes a prompt message for turning on the switch for a screen saver of another application within a preset time period; and if not, presenting a prompt message about whether to turn on the switch for screen saver of the first application in the notification bar.

Optionally, the broadcast information further comprises a state of the switch for screen saver of the first application;

the determination module includes:

an identification submodule, configured for identifying an application whose switch for screen saver is in an ON state based on the states of the switches for screen saver of the applications in the broadcast information sent by each of the other applications; and a determination submodule, configured for determining whether the first application has the highest priority among the first application and the other applications, whose switches for screen saver are in an ON state, based on the priorities of the applications contained in the latest version of configuration information.

Optionally, the apparatus further includes:

an updating module, configured for updating the configuration information saved by the first application at a preset time interval.

In a third aspect, the present application provides a mobile terminal including: a housing, a processor, a memory, a circuit board and a power supply circuit, wherein, the circuit board is placed inside a space enclosed by the housing, the processor and the memory are arranged on the circuit board; the power supply circuit is configured to provide power for various circuits or components of the mobile terminal; the memory is configured to store executable program codes; and the processor executes a program corresponding to the executable program codes by reading the executable program codes stored in the memory so as to carry out the method for presenting an screen saver of an application provided by the present application.

In a fourth aspect, the present application further provides a storage medium, which is configured to store executable program codes, wherein, the executable program codes is used for carrying out the method for presenting a screen saver of an application provided by the present application.

In a fifth aspect, the present application further provide an executable program code, which is configured to carry out the method for presenting a screen saver of an application provided by the present application.

In the method, apparatus, and mobile terminal for presenting a screen saver of an application provided by embodiments of the present application, the method includes: sending broadcast information by a first application installed on the mobile terminal to other applications when a screen saver is to be activated, wherein the broadcast information contains a version number of configuration information, saved by the first application, which contains priority information of each of applications; obtaining version numbers of the configuration information saved by other applications based on the received broadcast information from other applications; obtaining the latest version of configuration information based on the version number of the configuration information saved by the first application and the received version numbers of the configuration information saved by other applications; determining whether the first application has the highest priority among the first application and other applications based on the priorities of the applications contained in the latest version of configuration information; and if so, presenting the screen saver of the first application. In the embodiments, each application can determine whether to present its own screen saver based on priority information of applications contained in the configuration information, and present its own screen saver if it has the highest priority. Therefore, only one application will present its screen saver on the mobile terminal. The case where more than one applications present their screen savers at the same time will not occur. The stability of the system is improved.

BRIEF DESCRIPTION OF DRAWINGS

In order to describe embodiments of the present application and existing technologies clearly, drawings for embodiments of the present application and existing technologies will be described briefly below. It is obvious that the drawings below are only intended to illustrate some embodiments of the present application, and those skilled in the art can also obtain further drawings based on these drawings without any creative efforts.

DETAILED DESCRIPTION OF THE INVENTION

In order to make the objections, technical solutions as well as advantages of the present application more apparent and understandable, the present application will be described in more detail below with reference to the appended drawings and embodiments. Obviously, the described embodiments are only some of the embodiments of the present application, rather than all of the embodiments. All other embodiments obtained based on the embodiments of the present application by those skilled in the art without any creative efforts fall into the protection scope defined by the present application.

It should be noted that, in the absence of conflict, embodiments in the present application and features in the embodiments can be combined with each other. With reference to the drawings, the present application will be described in detail below in conjunction with the embodiments.

Figure 1:
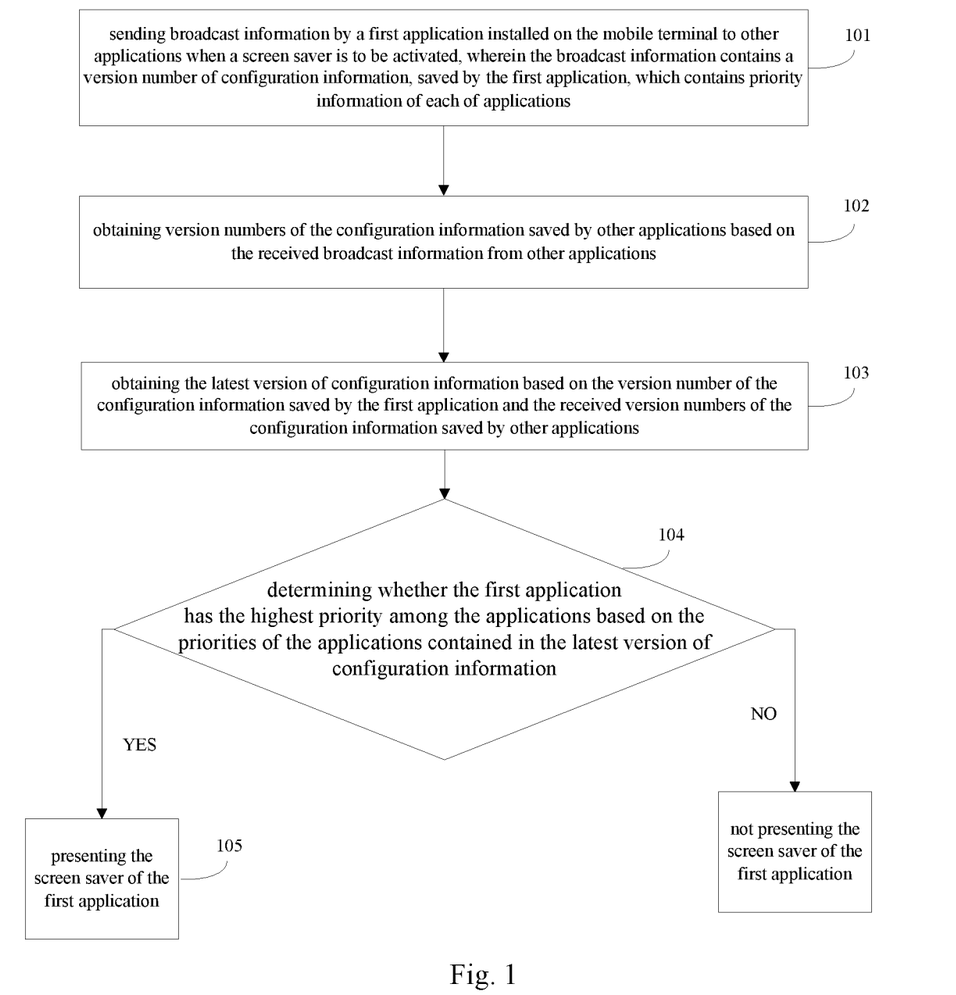
FIG. 1 shows a schematic flowchart of a method for presenting a screen saver of an application according to an embodiment of the present application.

Referring to FIG. 1, which shows a schematic flowchart of a method for presenting a screen saver of an application according to an embodiment of the present application.

As shown in FIG. 1, the method for presenting a screen saver of an application according to this embodiment, which is applicable in a mobile terminal, may include:

Step 101, sending broadcast information by a first application installed on the mobile terminal to other applications when a screen saver is to be activated, wherein the broadcast information contains a version number of configuration information, saved by the first application, which contains priority information of each of applications.

Some of the applications installed on the mobile terminal have a screen saver function. After an application with a screen saver function is installed on the mobile terminal, when there is no operation on the mobile terminal within a preset period (such as 5 seconds, 10 seconds, 20 seconds and the like), the application with a screen saver function may activate the screen saver and presenting it on the screen of the terminal.

As more and more applications are installed on the mobile terminal, more than one applications may present their screen savers at the same time when a screen saver is needed to be activated, which may affect the stability of the system.

Therefore, in this embodiment, each of the applications with a screen saver function may save configuration information containing priority information of the applications. When a screen saver is to be activated, each application can determine whether to present its own screen saver based on the priority information of each of the applications in the same configuration information, so as to avoid that more than one applications present their screen savers at the same time. For example, a screen saver of an application with the highest priority may be presented based on priority information of each of the applications contained in the configuration information.

The configuration information saved by each application may have a different version number. For example, the configuration information currently saved by each application can be configuration information that is saved when this application is installed. As each application may be installed at a different time, the version number of the configuration information saved by itself may be different. Alternatively, an application may update the configuration information saved by itself at a preset time interval. As such, the configuration information saved by some of the applications may have been updated, while the configuration information saved by other applications may have not been updated yet due to a different setting for update time or rejection of the update by a user. Therefore, the version of the configuration information saved by each application may be different.

To ensure that a screen saver of only one application is presented, each of the applications should determine whether to present its own screen saver based on the same version of configuration information. For example, each of the applications can determine its own priority and further determine whether to present its own screen saver based on the latest version of the configuration information.

In this embodiment, when screen saver is activated, a first application installed in the mobile terminal may send broadcast information to other applications, wherein the broadcast information contains a version number of the configuration information, saved by the first application, which contains priority information of each of applications.

After the first application sends the broadcast information, each of the other applications installed in the terminal can receive the broadcast information sent by the first application. Since first application may be any of the applications with the screen saver function in the mobile terminal, each application with the screen saver function in the mobile terminal will send broadcast information to other applications when activating a screen saver. In this embodiment and subsequent embodiments of the present application, an application with the screen saver function are collectively referred to as an application for convenience. Therefore, any of the applications in the mobile terminal will receive broadcast information sent by another application.

Step 102, obtaining version numbers of the configuration information saved by other applications based on the received broadcast information from other applications.

When the first application is sending the broadcast information, other applications may also send broadcast information containing version numbers of the configuration information saved by each of the other applications. Thus, the first application may receive the broadcast information sent by other applications, and obtain version numbers of the configuration information saved by other applications based on the received broadcast information from other applications. In this embodiment, the first application may receive broadcast information sent by each of the other applications to obtain the version number of the configuration information saved by each of the other applications.

Step 103, obtaining the latest version of configuration information based on the version number of the configuration information saved by the first application and the received version numbers of the configuration information saved by other applications.

After receiving broadcast information sent by each of the other applications which contains the version number of configuration information saved by each of the other applications, the first application obtains the version number of the configuration information saved by each of applications. Thus, the first application may obtain the latest version of configuration information based on the version number of the configuration information saved by the first application and the received version numbers of the configuration information saved by other applications, and determine whether to activate its own screen saver based on its own priority in the priority information of each of the applications saved in the latest version of configuration information.

Specifically, the first application may first identify the latest version number from all the version numbers of the configuration information based on the version number of the configuration information saved by the first application and the received version numbers of the configuration information saved by other applications, and then determine whether the version number of the configuration information saved by the first application is the latest version number. If so, it is indicated that the configuration information saved by the first application is the latest version of configuration information. The first application may thus obtain the configuration information saved by itself as the latest version of configuration information. Furthermore, the first application can send broadcast information containing the configuration information saved by itself, so that other applications can determine whether to activate their screen savers based on this configuration information.

If the version number of the configuration information saved by the first application is not the latest, it is indicated that the latest version of configuration information is saved by other applications. As mentioned above, since any application with a screen saver function in a mobile terminal may be the first application, an application saving the latest version of configuration information will send broadcast information containing its configuration information to other applications. Thus, the first application can receive the broadcast information, sent by another application, containing the configuration information with the latest version number, and obtain the configuration information contained in this broadcast information as the latest version of configuration information.

When the broadcast information sent by the first application contains only the version number of the configuration information saved by itself, in order to obtain the latest version of configuration information, at least one application in the mobile terminal is required to send broadcast information again so that all the applications can obtain the latest version of configuration information.

Optionally, in order to reduce the amount of broadcast information sent by applications and improve the efficiency of presenting a screen saver, the broadcast information sent by the first application may further contain configuration information saved by itself. When the broadcast information sent by the first application contains configuration information saved by itself, after receiving broadcast information sent by other applications, the first application can obtain the latest version of configuration information based on the configuration information saved by the first application and the version number thereof and the received configuration information saved by other applications and the version numbers thereof.

By adding configuration information into the broadcast information sent by the first application, the amount of the broadcast information sent by applications in a mobile terminal can be reduced. Efficiency of presenting a screen saver can be further improved.

Step 104, determining whether the first application has the highest priority among the applications based on the priorities of the applications contained in the latest version of configuration information; and not presenting the screen saver of the first application if the first application does not have the highest priority.

After obtaining the latest version of configuration information, the first application can determine whether it has the highest priority among the applications based on the priorities of the applications contained in the configuration information. If the first application does not have the highest priority, it is indicated that there is other application with a higher priority than that of the first application. The first application thus does not present its own screen saver.

It should be noted that, the configuration information saved by each of applications may contain priorities of a large number of applications, while only some of these applications involved in the configuration information may be installed on a mobile terminal. In addition, some of the applications installed on a mobile terminal may become unresponsive. Therefore, in order to accurately determine whether to present its own screen saver and avoid the affect of an application with a higher priority than the first application being not installed in the mobile terminal or being unresponsive, the first application can determine whether it has the highest priority among itself and applications that send broadcast information to other applications, so as to accurately determine whether to present the screen saver of the first application.

Step 105, presenting the screen saver of the first application if the first application has the highest priority.

When the first application determines that it has the highest priority, the first application can present its screen saver. The other applications have lower priorities than that of the first application, and thus do not present their screen savers. As such, only the screen saver of the first application is presented in the terminal.

In the method for presenting a screen saver of an application according to this embodiment, each of applications can determine whether to present its own screen saver based on priority information of the applications contained in configuration information, and an application with the highest priority presents its own screen saver. Therefore, a screen saver of only one application will be presented on the mobile terminal. The case where more than one applications present their screen savers at the same time will not occur. The stability of the system is improved.

Figure 2:
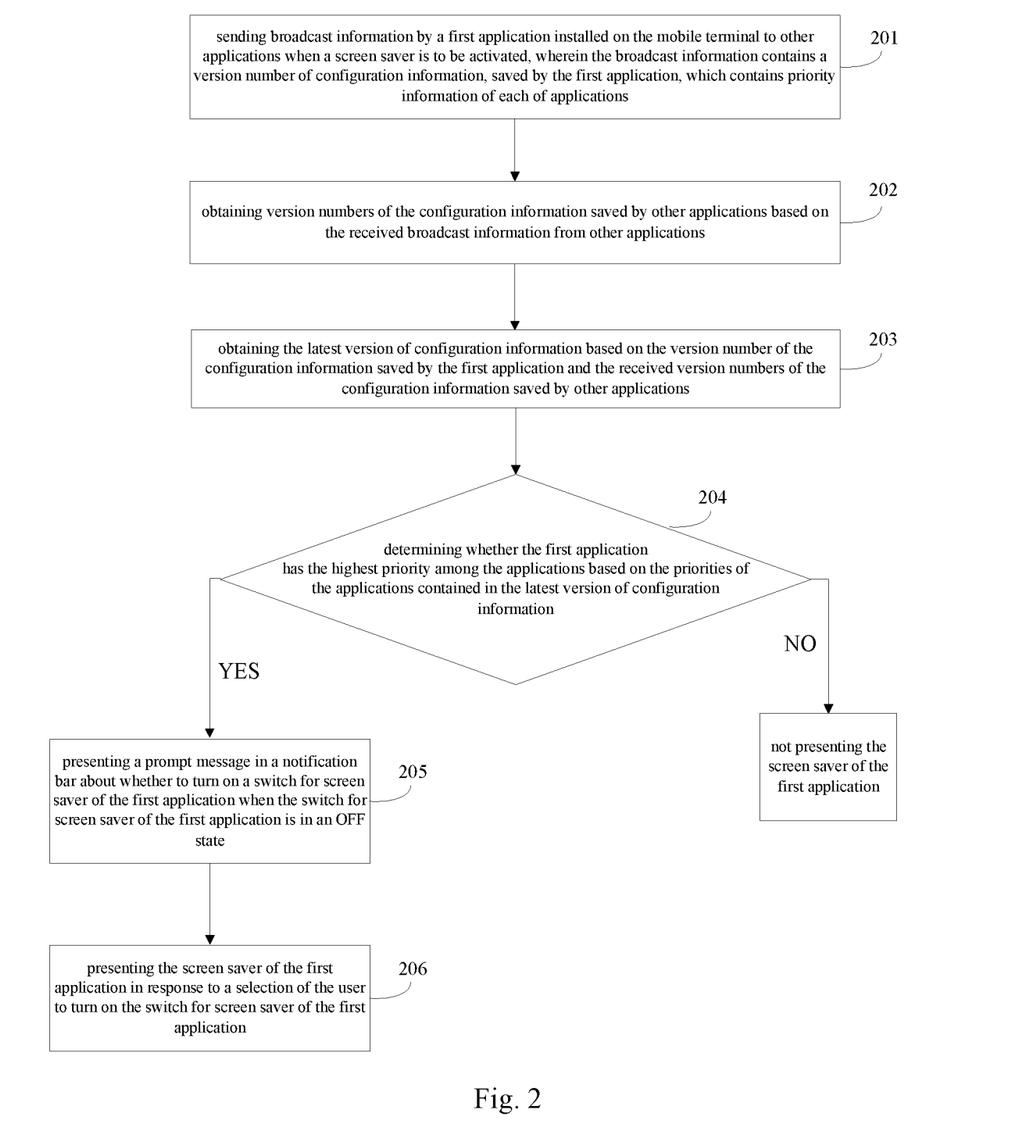
FIG. 2 shows a schematic flowchart of a method for presenting a screen saver of an application according to another embodiment of the present application.

Reference to FIG. 2, which shows a schematic flowchart of a method for presenting a screen saver of an application according to another embodiment of the present application.

As shown in FIG. 2, the method for presenting a screen saver of an application according to this embodiment, which is applicable in a mobile terminal, may include:

Step 201, sending broadcast information by a first application installed on the mobile terminal to other applications when a screen saver is to be activated, wherein the broadcast information contains a version number of configuration information, saved by the first application, which contains priority information of each of applications.

Step 202, obtaining version numbers of the configuration information saved by other applications based on the received broadcast information from other applications.

Step 203, obtaining the latest version of configuration information based on the version number of the configuration information saved by the first application and the received version numbers of the configuration information saved by other applications.

Step 204, determining whether the first application has the highest priority among the applications based on the priorities of the applications contained in the latest version of configuration information; and presenting the screen saver of the first application only if the first application has the highest priority.

Step 205, presenting a prompt message in a notification bar about whether to turn on a switch for screen saver of the first application when the first application has the highest priority and the switch for screen saver of the first application is in an OFF state.

When it is determined that the first application has the highest priority, the first application can present its own screen saver. However, in a case where a user did not turn on the switch for screen saver of the first application when installing the first application, or the user turned off the switch for screen saver of the first application at a certain time after installation, the switch for screen saver of the first application would be in an OFF state. The first application is then not capable of presenting its own screen saver.

In this embodiment, a prompt message about whether to turn on the switch for screen saver of the first application can be presented when the switch for screen saver of the first application is in an OFF state. Specifically, the prompt message about whether to turn on the switch for screen saver of the first application can be presented in a notification bar of the mobile terminal.

In some cases, the user may not want to present a screen saver on a mobile terminal, or the user may want to present on the mobile terminal a screen saver of the system, instead of the screen saver of an application. The user may thus close the prompt message, presented by any application, about whether to turn on the switch for screen saver of the application.

In this embodiment, in order to avoid repeated interruptions to the user, the first application can determine whether the user closes a prompt message for turning on the switch for a screen saver of another application within a preset time period (such as 5, 10, 20 minutes, etc.). For example, when a user closes a prompt message for turning on the switch for screen saver of any application, this application may send broadcast information to other applications. Therefore, the first application can determine whether the user closes the prompt message for turning on the switch for a screen saver of any other application within a preset time period based on the broadcast information sent by other applications.

If a user closes a prompt message for turning on the switch for a screen saver of another application within a preset time period, it is indicated that the user does not want to present the screen saver of any application. When a user does not close a prompt message for turning on the switch for screen saver of another application within a set time interval, it is indicated that the user wants to present the screen saver of the application.

If a user does not close a prompt message for turning on the switch for screen saver of another application within a preset time period, the first application may present a prompt message about whether to turn on the switch for screen saver of the first application in the notification bar, so that the user may choose to turn on the switch for screen saver of the first application or not.

Step 206, presenting the screen saver of the first application in response to a selection of the user to turn on the switch for screen saver of the first application.

If a selection of the user to turn on the switch for screen saver of the first application is detected, the first application may present its own screen saver.

In the method according to this embodiment, when it is determined that the first application has the highest priority and the switch for screen saver thereof is in an OFF state, the first application may present a prompt message about whether to turn on its switch for screen saver. This may guild the user to turn on the switch for screen saver of the first application and thus to present the screen saver of the first application. Furthermore, it is further possible to determine, based on whether the user closes a prompt message for turning on the switch for screen saver of another application within a set time interval, whether to present a prompt message about whether to turn on the switch for screen saver of the first application in a notification bar. In a case where the user does not close the prompt message for turning on the switch for screen saver of another application within a preset time period, the presentation of a prompt message about whether to turn on the switch for screen saver of the first application in the notification bar may avoid repeated interruptions to the user.

Figure 3:
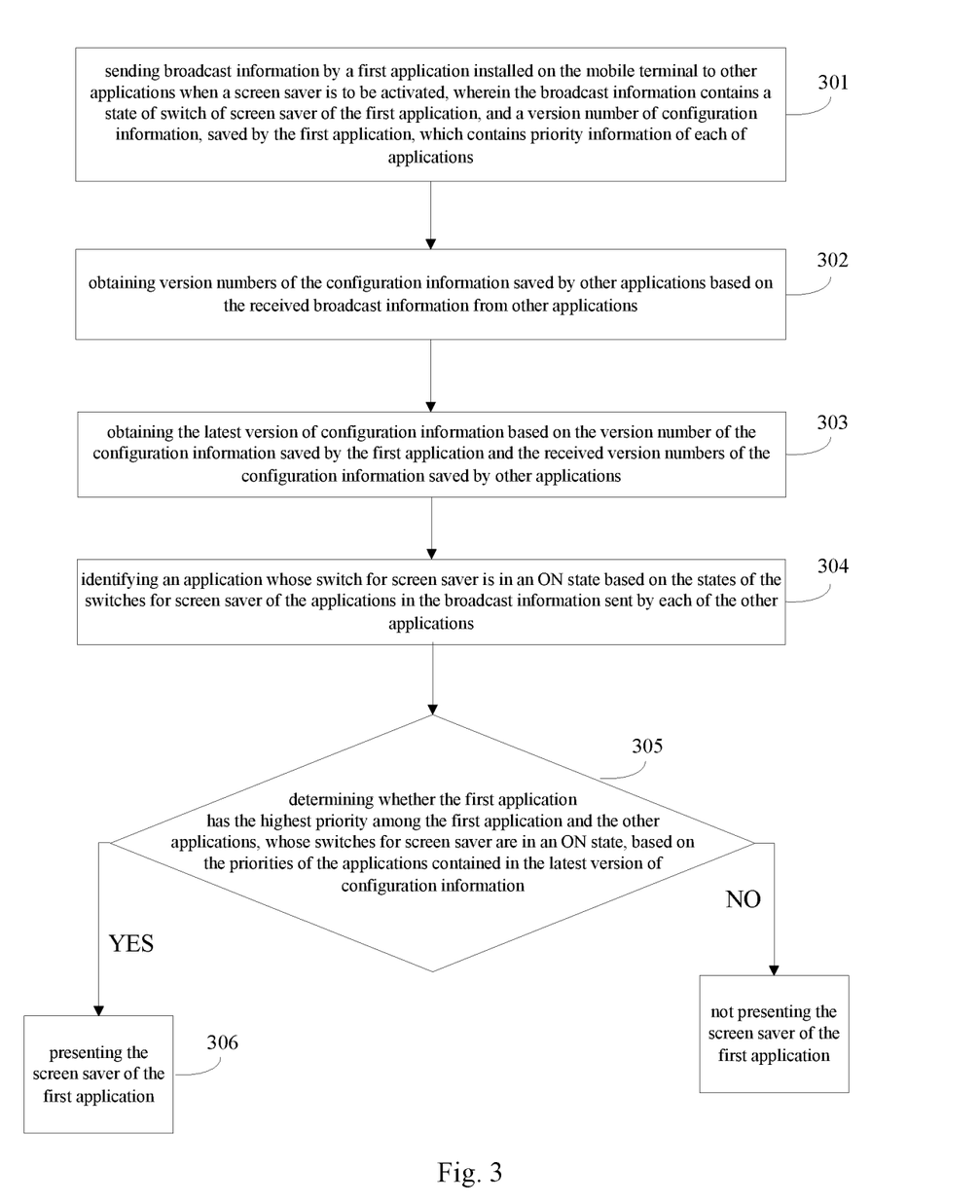
FIG. 3 shows a schematic flowchart of a method for presenting a screen saver of an application according to another embodiment of the present application.

Reference to FIG. 3, which shows a schematic flowchart of a method for presenting a screen saver of an application according to another embodiment of the present application.

As shown in FIG. 3, the method for presenting a screen saver of an application according to this embodiment, which is applicable in a mobile terminal, may include:

Step 301, sending broadcast information by a first application installed on the mobile terminal to other applications when a screen saver is to be activated, wherein the broadcast information contains a state of switch of screen saver of the first application, and a version number of configuration information, saved by the first application, which contains priority information of each of applications.

The first application may determine whether to present its own screen saver based on the state of the switch for screen saver of each application, in addition to priority information of each application saved in the configuration information. For example, in a case where, according to the current configuration information, the first application does not have the highest priority but the switch for screen saver of the application with higher priority than the first application is in an OFF state, the first application may also present its own screen saver.

Therefore, in this embodiment, when screen saver is activated, the first application can send, to the other application, broadcast information containing the state of the switch for screen saver of the first application, and the version number of the configuration information, saved by the first application, which contains the priority information of each of applications.

Step 302, obtaining version numbers of the configuration information saved by other applications based on the received broadcast information from other applications.

Step 303, obtaining the latest version of configuration information based on the version number of the configuration information saved by the first application and the received version numbers of the configuration information saved by other applications.

Step 304, identifying an application whose switch for screen saver is in an ON state based on the states of the switches for screen saver of the applications in the broadcast information sent by each of the other applications.

In this embodiment, the first application can determine whether to present its own screen saver based on the priority information of the applications in the configuration information and the states of the switches for screen saver of the applications. The priorities of the applications whose switches for screen saver are in an OFF state will not affect the determination of the first application on whether to present its own screen saver. Thus, the first application can identify the applications whose switches for screen saver are in an ON state based on the states of the switches for screen savers of the applications in the broadcast information sent by each of the other applications.

Step 305, determining whether the first application has the highest priority among the first application and the other applications, whose switches for screen saver are in an ON state, based on the priorities of the applications contained in the latest version of configuration information; and presenting the screen saver of the first application only if the first application has the highest priority among applications whose the switches for screen saver are in an ON state.

After determining the applications whose the switches for screen saver are in an ON state, the first application can determine whether the first application has the highest priority among the applications whose the switches for screen saver are in on an ON state based on the priorities of the applications contained in the latest version of configuration information. If the first application does not have the highest priority among the applications whose the switches for screen saver are in on an ON state, it is indicated that there is other application with higher priority whose the switch for screen saver is in an ON state. The first application thus does not present its own screen saver.

Step 306, presenting the screen saver of the first application if the first application has the highest priority among the applications whose the switches for screen saver are in an ON state.

When it is determined that the first application has the highest priority among itself and applications, whose the switches for screen saver are in an ON state, that send broadcast information, the first application can present its own screen saver. The priorities of other applications whose switches for screen saver are in an ON state are all lower than that of the first application. Thus, all the other applications do not present their own screen savers. As such, only the screen saver of the first application is presented in the terminal.

In the method provided in this embodiment, the first application can determine whether to present its own screen saver based on the priority information of applications saved by the configuration information and the states of the switches for screen saver of the applications. If the first application has the highest priority among applications whose the switches for screen saver are in an ON state, the screen saver of the first application is presented. An accurate determination of whether to turn on the screen saver of the first application may be obtained and interruption to users can be avoided. The stability of the system is hereby improved.

Figure 4:
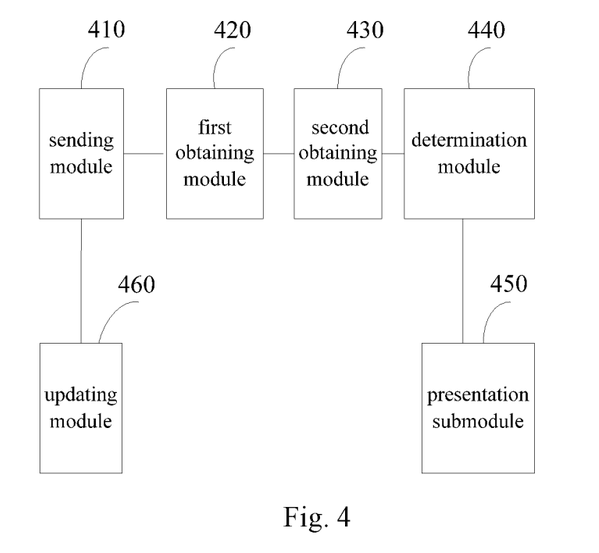
FIG. 4 shows a schematic view of the structure of an apparatus for presenting a screen saver of an application according to an embodiment of the present application.

Reference to FIG. 4, which shows a schematic view of the structure of an apparatus for presenting a screen saver of an application according to an embodiment of the present application.

As shown in FIG. 4, the apparatus for presenting a screen saver of an application according to an embodiment of the present application is applicable in a mobile terminal and may include:

a sending module 410, configured for sending broadcast information by a first application installed on the mobile terminal to other applications when a screen saver is to be activated, wherein the broadcast information contains a version number of configuration information, saved by the first application, which contains priority information of each of applications;

a first obtaining module 420, configured for obtaining version numbers of the configuration information saved by other applications based on the received broadcast information from other applications;

a second obtaining module 430, configured for obtaining the latest version of configuration information based on the version number of the configuration information saved by the first application and the received version numbers of the configuration information saved by other applications;

a determination module 440, configured for determining whether the first application has the highest priority among the first application and other applications based on the priorities of the applications contained in the latest version of configuration information;

a presentation module 450, configured for presenting the screen saver of the first application if the result from the determination module is positive.

Further, the second obtaining module 430 includes:

an identification submodule (not shown in the figures), configured for identifying the latest version number from all the version numbers of the configuration information based on the version number of the configuration information saved by the first application and the received version numbers of the configuration information saved by other applications;

an obtaining submodule (not shown in the figures), configured for: determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Further, the broadcast information further contains configuration information, saved by the first application, which contains priority information of each of applications;

the second obtaining module 430 is further configured for:

obtaining the latest version of configuration information based on the configuration information saved by the first application and the version number thereof and the received configuration information saved by other applications and the version numbers thereof.

Further, the device further includes:

an updating module 460, configured for updating the configuration information saved by the first application at a preset time interval.

In an optional implementation of this embodiment, the presentation module 450 can further include:

a display submodule (not shown in the figures), configured for presenting, in a notification bar, a prompt message about whether to turn on the switch for screen saver of the first application, when the switch for screen saver of the first application is in an OFF state;

a presentation submodule (not shown in the figures), configured for presenting the screen saver of the first application in response to a selection of the user to turn on the switch for screen saver of the first application.

Further, the display submodule is further configured for: determining whether the user closes a prompt message for turning on the switch for screen saver of another application within a preset time period; and if not, presenting a prompt message about whether to turn on the switch for screen saver of the first application in the notification bar.

In another optional implementation of this embodiment, the broadcast information further comprises a state of the switch for screen saver of the first application.

The determination module 440 can include:

an identification submodule (not shown in the figures), configured for identifying an application whose a switch for screen saver is in an ON state based on the states of the switches for screen saver of the applications in the broadcast information sent by each of the other applications; and a determination submodule (not shown in the figures), configured for determining whether the first application has the highest priority among the first application and the other applications, whose the switches for screen saver are in an ON state, based on the priorities of the applications contained in the latest version of configuration information.

In the apparatus for presenting a screen saver of an application provided by this embodiment, each application can determine whether to present its own screen saver based on priority information of applications contained in the configuration information, and present its own screen saver if it has the highest priority. Therefore, only one application will present its screen saver on the mobile terminal. The case where more than one applications present their screen savers at the same time will not occur. The stability of the system is improved.

The first application may, when it is determined to have the highest priority and its switch for screen saver is in an OFF state, present a prompt message about whether to turn on its switch for screen saver. This may guild a user to turn on the switch for screen saver of the first application and thus to present the screen saver of the first application. Furthermore, it is further possible to determine, based on whether the user closes a prompt message about turning on the switch for screen saver of another application within a set time interval, whether to present a prompt message about whether to turn on the switch for screen saver of the first application in a notification bar. In the case where the user does not close the prompt message about to turning on the switch for screen saver of another application within a preset time period, the presentation of a prompt message about whether to turn on the switch for screen saver of the first application in the notification bar may avoid repeated interruptions to the user.

Moreover, the first application can determine whether to present its own screen saver based on the priority information of applications saved by the configuration information and the states of the switches for screen saver of the applications. If the first application has the highest priority among applications whose switches for screen saver are in an ON state, the screen saver of the first application is presented. An accurate determination of whether to turn on the screen saver of the first application may be obtained and interruption to users can be avoided. The stability of the system is hereby improved.

Figure 5:
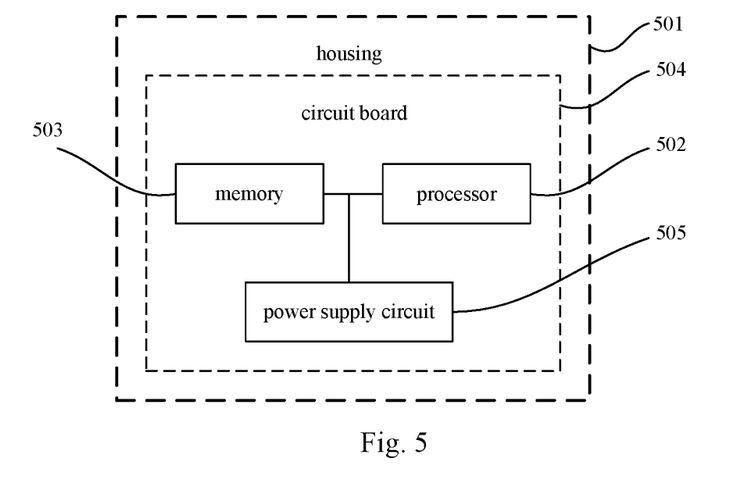
FIG. 5 shows a schematic structure diagram of a mobile terminal device according to an embodiment of the present application.

Moreover, embodiments of the present application further provide a mobile terminal as shown in FIG. 5, which includes a housing 501, a processor 502, a memory 503, a circuit board 504 and a power supply circuit 505, wherein, the circuit board 504 is placed inside a space enclosed by the housing 501, the processor 502 and the memory 503 are arranged on the circuit board 504; the power supply circuit 505 is configured to provide power for various circuits or devices of the electronic apparatus; the memory 503 is configured to store executable program codes, and the processor 502 executes a program corresponding to the executable program codes by reading the executable program codes stored in the memory 503 so as to perform the method for presenting a screen saver of an application provided by an embodiment of the present application. The method includes:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and if so, presenting the screen saver of the first application.

Wherein, obtaining the latest version of configuration information based on the version number of the configuration information saved by the first application and the received version numbers of the configuration information saved by other applications, includes:

identifying the latest version number from all the version numbers of the configuration information based on the version number of the configuration information saved by the first application and the received version numbers of the configuration information saved by other applications; and determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Wherein, the broadcast information further contains configuration information, saved by the first application, which contains priority information of each of applications;

obtaining the latest version of configuration information based on the version number of the configuration information saved by the first application and the received version numbers of the configuration information saved by other applications, comprises:

obtaining the latest version of configuration information based on the configuration information saved by the first application and the version number thereof and the received configuration information saved by other applications and the version numbers thereof.

Wherein, presenting the screen saver of the first application includes:

presenting, in a notification bar, a prompt message about whether to turn on the switch for screen saver of the first application, when the switch for screen saver of the first application is in an OFF state; and presenting the screen saver of the first application in response to a selection of the user to turn on the switch for screen saver of the first application.

Wherein, presenting, in a notification bar, a prompt message about whether to turn on the switch for screen saver of the first application includes:

determining whether the user closes a prompt message for turning on the switch for screen saver of another application within a preset time period; and if not, presenting a prompt message about whether to turn on the switch for screen saver of the first application in the notification bar.

Wherein, the broadcast information further comprises a state of the switch for screen saver of the first application;

determining whether the first application has the highest priority among the first application and other applications based on the priorities of the applications contained in the latest version of configuration information, includes:

identifying an application whose a switch for screen saver is in an ON state based on the states of the switches for screen saver of the applications in the broadcast information sent by each of the other applications; and determining whether the first application has the highest priority among the first application and the other applications, whose the switches for screen saver are in an ON state, based on the priorities of the applications contained in the latest version of configuration information.

Wherein, the method further includes:

updating the configuration information saved by the first application at a preset time interval.

Regarding the specific process of performing the above steps by the processor 502 and further steps performed by the processor 502 through performing executable program codes, reference can be made to the description of the embodiments as shown in FIGS. 1 to 4 of the application, which will not be repeatedly described here.

As seen from above, in the embodiments of the present application, each application can determine whether to present its own screen saver based on priority information of applications contained in configuration information, and present its own screen saver if it has the highest priority. Therefore, only one application will present its screen saver on the mobile terminal. The case where more than one applications present their screen savers at the same time will not occur. The stability of the system is improved.

The mobile terminal provided by embodiments of the present application can exist in various forms, including but not limited to:

(1) a mobile communication device. Such kind of device is characterized in ability of mobile communication and mainly aims to provide voice and data communication. This kind of terminals includes: smartphones (e.g. iPhone), multimedia phones, functional phones and low-end phones and the like.

(2) an ultra-mobile personal computer device. This kind of apparatus belongs to the category of personal computer, has the function of computing and possessing, and generally possesses mobile networking function. This kind of terminal includes: PDA, MID and UMPC apparatuses and the like, for example iPad.

In addition, embodiments of the present application further provide a storage medium, which is configured to store executable program codes, wherein, the executable program codes is used for carrying out the method for presenting a screen saver of an application provided by embodiments of the present application. The method can include:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and if so, presenting the screen saver of the first application.

Wherein, obtaining the latest version of configuration information based on the version number of the configuration information saved by the first application and the received version numbers of the configuration information saved by other applications, includes:

identifying the latest version number from all the version numbers of the configuration information based on the version number of the configuration information saved by the first application and the received version numbers of the configuration information saved by other applications; and determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Wherein, the broadcast information further contains configuration information, saved by the first application, which contains priority information of each of applications;

obtaining the latest version of configuration information based on the version number of the configuration information saved by the first application and the received version numbers of the configuration information saved by other applications, includes:

obtaining the latest version of configuration information based on the configuration information saved by the first application and the version number thereof and the received configuration information saved by other applications and the version numbers thereof.

Wherein, presenting the screen saver of the first application includes:

presenting, in a notification bar, a prompt message about whether to turn on the switch for screen saver of the first application, when the switch for screen saver of the first application is in an OFF state; and presenting the screen saver of the first application in response to a selection of the user to turn on the switch for screen saver of the first application.

Wherein, presenting, in a notification bar, a prompt message about whether to turn on the switch for screen saver of the first application includes:

determining whether the user closes a prompt message for turning on the switch for screen saver of another application within a preset time period; and if not, presenting a prompt message about whether to turn on the switch for screen saver of the first application in the notification bar.

Wherein, the broadcast information further comprises a state of the switch for screen saver of the first application;

determining whether the first application has the highest priority among the first application and other applications based on the priorities of the applications contained in the latest version of configuration information, includes:

identifying an application whose a switch for screen saver is in an ON state based on the states of the switches for screen saver of the applications in the broadcast information sent by each of the other applications; and determining whether the first application has the highest priority among the first application and the other applications, whose the switches for screen saver are in an ON state, based on the priorities of the applications contained in the latest version of configuration information.

Wherein, the method further includes:

updating the configuration information saved by the first application at a preset time interval.

In addition, embodiments of the present application further provide an application program for performing the method for presenting a screen saver of an application provided by embodiments of the present application. The method can include:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and if so, presenting the screen saver of the first application.

Wherein, obtaining the latest version of configuration information based on the version number of the configuration information saved by the first application and the received version numbers of the configuration information saved by other applications, includes:

identifying the latest version number from all the version numbers of the configuration information based on the version number of the configuration information saved by the first application and the received version numbers of the configuration information saved by other applications; and determining whether the version number of the configuration information saved by the first application is the latest version number; if so, obtaining the configuration information saved by the first application as the latest version of configuration information, and sending broadcast information containing the configuration information saved by the first application, or otherwise, receiving broadcast information, sent by another application, which contains the configuration information with the latest version number, and obtaining the configuration information contained in the received broadcast information as the latest version of configuration information.

Wherein, the broadcast information further contains configuration information, saved by the first application, which contains priority information of each of applications;

obtaining the latest version of configuration information based on the version number of the configuration information saved by the first application and the received version numbers of the configuration information saved by other applications, includes:

obtaining the latest version of configuration information based on the configuration information saved by the first application and the version number thereof and the received configuration information saved by other applications and the version numbers thereof.

Wherein, presenting the screen saver of the first application includes:

presenting, in a notification bar, a prompt message about whether to turn on the switch for screen saver of the first application, when the switch for screen saver of the first application is in an OFF state; and presenting the screen saver of the first application in response to a selection of the user to turn on the switch for screen saver of the first application.

Wherein, presenting, in a notification bar, a prompt message about whether to turn on the switch for screen saver of the first application includes:

determining whether the user closes a prompt message for turning on the switch for screen saver of another application within a preset time period; and if not, presenting a prompt message about whether to turn on the switch for screen saver of the first application in the notification bar.

Wherein, the broadcast information further comprises a state of the switch for screen saver of the first application;

determining whether the first application has the highest priority among the first application and other applications based on the priorities of the applications contained in the latest version of configuration information, includes:

identifying an application whose a switch for screen saver is in an ON state based on the states of the switches for screen saver of the applications in the broadcast information sent by each of the other applications; and determining whether the first application has the highest priority among the first application and the other applications, whose the switches for screen saver are in an ON state, based on the priorities of the applications contained in the latest version of configuration information.

Wherein, the method further includes:

updating the configuration information saved by the first application at a preset time interval.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices which comprise the listed elements.

All embodiments in the description are described in a correlated manner, and identical or similar parts in various embodiments can be referred to one another, the description for each embodiment all focuses on the differences with other embodiments. Especially, the embodiments of a device are briefly described and reference can be made to the description of the embodiments of a method for its related contents since the embodiments of the device are substantially similar to those of the method. The embodiments of a system or a device are briefly described and reference can be made to the description of the embodiments of a method for its related contents since the embodiments of the device are substantially similar to those of the method.

The embodiments described above are just preferable embodiments of the present application, and not indented to limit the protection scope of the present application. Any modifications, alternatives, improvements or the like within the spirit and principle of the present application shall be included in the protection scope of the present application.

What is claimed is:

1. A method for presenting a screen saver of an application, which is applicable in a mobile terminal, comprising:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and if so, presenting the screen saver of the first application.

2. The method of claim 1, wherein, obtaining the latest version of configuration information based on the version number of the configuration information saved by the first application and the received version numbers of the configuration information saved by other applications, comprises:

identifying the latest version number from all the version numbers of the configuration information based on the version number of the configuration information saved by the first application and the received version numbers of the configuration information saved by other applications; and determining whether the version number of the configuration information saved by the first application is the latest version number; if so, obtaining the configuration information saved by the first application as the latest version of configuration information, and sending broadcast information containing the configuration information saved by the first application; or otherwise, receiving broadcast information, sent by another application, which contains the configuration information with the latest version number, and obtaining the configuration information contained in the received broadcast information as the latest version of configuration information.

3. The method of claim 1, wherein, the broadcast information further contains configuration information, saved by the first application, which contains priority information of each of applications;

obtaining the latest version of configuration information based on the version number of the configuration information saved by the first application and the received version numbers of the configuration information saved by other applications, comprises:

obtaining the latest version of configuration information based on the configuration information saved by the first application and the version number thereof and the received configuration information saved by other applications and the version numbers thereof.

4. The method of claim 1, wherein, presenting the screen saver of the first application comprises:

presenting, in a notification bar, a prompt message about whether to turn on the switch for screen saver of the first application, when the switch for screen saver of the first application is in an OFF state; and presenting the screen saver of the first application in response to a selection of the user to turn on the switch for screen saver of the first application.

5. The method of claim 4, wherein, presenting, in a notification bar, a prompt message about whether to turn on the switch for screen saver of the first application comprises:

determining whether the user closes a prompt message for turning on the switch for a screen saver of another application within a preset time period; and if not, presenting a prompt message about whether to turn on the switch for screen saver of the first application in the notification bar.

6. The method of claim 1, wherein, the broadcast information further comprises a state of the switch for screen saver of the first application;

determining whether the first application has the highest priority among the first application and other applications based on the priorities of the applications contained in the latest version of configuration information, comprises:
identifying an application whose switch for screen saver is in an ON state based on the states of the switches for screen saver of the applications in the broadcast information sent by each of the other applications; and
determining whether the first application has the highest priority among the first application and the other applications, whose switches for screen saver are in an ON state, based on the priorities of the applications contained in the latest version of configuration information.

7. The method of claim 1, wherein the method further comprises:
updating the configuration information saved by the first application at a preset time interval.

8. A mobile terminal, comprising: a housing, a processor, a memory, a circuit board and a power supply circuit, wherein, the circuit board is placed inside a space enclosed by the housing, the processor and the memory are arranged on the circuit board; the power supply circuit is configured to provide power for various circuits or components of the mobile terminal; the memory is configured to store executable program codes; and the processor executes a program corresponding to the executable program codes by reading the executable program codes stored in the memory so as to carry out a method for presenting a screen saver of an application, the method comprises:
sending broadcast information by a first application installed on the mobile terminal to other applications when a screen saver is to be activated, wherein the broadcast information contains a version number of configuration information, saved by the first application, which contains priority information of each of applications;
obtaining version numbers of the configuration information saved by other applications based on the received broadcast information from other applications;
obtaining the latest version of configuration information based on the version number of the configuration information saved by the first application and the received version numbers of the configuration information saved by other applications;
determining whether the first application has the highest priority among the first application and other applications based on the priorities of the applications contained in the latest version of configuration information; and
if so, presenting the screen saver of the first application.

9. The mobile terminal of claim 8, wherein, obtaining the latest version of configuration information based on the version number of the configuration information saved by the first application and the received version numbers of the configuration information saved by other applications, comprises:
identifying the latest version number from all the version numbers of the configuration information based on the version number of the configuration information saved by the first application and the received version numbers of the configuration information saved by other applications; and
determining whether the version number of the configuration information saved by the first application is the latest version number; if so, obtaining the configuration information saved by the first application as the latest version of configuration information, and sending broadcast information containing the configuration information saved by the first application; or otherwise, receiving broadcast information, sent by another application, which contains the configuration information with the latest version number, and obtaining the configuration information contained in the received broadcast information as the latest version of configuration information.

10. The mobile terminal of claim 8, wherein, the broadcast information further contains configuration information, saved by the first application, which contains priority information of each of applications;
obtaining the latest version of configuration information based on the version number of the configuration information saved by the first application and the received version numbers of the configuration information saved by other applications, comprises:
obtaining the latest version of configuration information based on the configuration information saved by the first application and the version number thereof and the received configuration information saved by other applications and the version numbers thereof.

11. The mobile terminal of claim 8, wherein, presenting the screen saver of the first application comprises:
presenting, in a notification bar, a prompt message about whether to turn on the switch for screen saver of the first application, when the switch for screen saver of the first application is in an OFF state; and
presenting the screen saver of the first application in response to a selection of the user to turn on the switch for screen saver of the first application.

12. The mobile terminal of claim 11, wherein, presenting, in a notification bar, a prompt message about whether to turn on the switch for screen saver of the first application comprises:
determining whether the user closes a prompt message for turning on the switch for a screen saver of another application within a preset time period; and
if not, presenting a prompt message about whether to turn on the switch for screen saver of the first application in the notification bar.

13. The mobile terminal of claim 8, wherein, the broadcast information further comprises a state of the switch for screen saver of the first application;
determining whether the first application has the highest priority among the first application and other applications based on the priorities of the applications contained in the latest version of configuration information, comprises:
identifying an application whose switch for screen saver is in an ON state based on the states of the switches for screen saver of the applications in the broadcast information sent by each of the other applications; and
determining whether the first application has the highest priority among the first application and the other applications, whose switches for screen saver are in an ON state, based on the priorities of the applications contained in the latest version of configuration information.

14. The mobile terminal of claim 8, wherein the method further comprises:
updating the configuration information saved by the first application at a preset time interval.

15. A non-transitory computer storage medium, which is configured to store executable program codes, wherein, the executable program codes is used for carrying out the method for presenting a screen saver of an application according to a method for presenting a screen saver of an application, the method comprises:

sending broadcast information by a first application installed on the mobile terminal to other applications when a screen saver is to be activated, wherein the broadcast information contains a version number of configuration information, saved by the first application, which contains priority information of each of applications;

obtaining version numbers of the configuration information saved by other applications based on the received broadcast information from other applications;

obtaining the latest version of configuration information based on the version number of the configuration information saved by the first application and the received version numbers of the configuration information saved by other applications;

determining whether the first application has the highest priority among the first application and other applications based on the priorities of the applications contained in the latest version of configuration information; and     if so, presenting the screen saver of the first application.

16. The non-transitory computer storage medium of claim 15, wherein, obtaining the latest version of configuration information based on the version number of the configuration information saved by the first application and the received version numbers of the configuration information saved by other applications, comprises:

identifying the latest version number from all the version numbers of the configuration information based on the version number of the configuration information saved by the first application and the received version numbers of the configuration information saved by other applications; and     determining whether the version number of the configuration information saved by the first application is the latest version number; if so, obtaining the configuration information saved by the first application as the latest version of configuration information, and sending broadcast information containing the configuration information saved by the first application; or otherwise, receiving broadcast information, sent by another application, which contains the configuration information with the latest version number, and obtaining the configuration information contained in the received broadcast information as the latest version of configuration information.

17. The non-transitory computer storage medium of claim 15, wherein, the broadcast information further contains configuration information, saved by the first application, which contains priority information of each of applications;

obtaining the latest version of configuration information based on the version number of the configuration information saved by the first application and the received version numbers of the configuration information saved by other applications, comprises:

obtaining the latest version of configuration information based on the configuration information saved by the first application and the version number thereof and the received configuration information saved by other applications and the version numbers thereof.

18. The non-transitory computer storage medium of claim 15, wherein, presenting the screen saver of the first application comprises:

presenting, in a notification bar, a prompt message about whether to turn on the switch for screen saver of the first application, when the switch for screen saver of the first application is in an OFF state; and     presenting the screen saver of the first application in response to a selection of the user to turn on the switch for screen saver of the first application.

19. The non-transitory computer storage medium of claim 18, wherein, presenting, in a notification bar, a prompt message about whether to turn on the switch for screen saver of the first application comprises:

determining whether the user closes a prompt message for turning on the switch for a screen saver of another application within a preset time period; and     if not, presenting a prompt message about whether to turn on the switch for screen saver of the first application in the notification bar.

20. The non-transitory computer storage medium of claim 15, wherein, the broadcast information further comprises a state of the switch for screen saver of the first application;

determining whether the first application has the highest priority among the first application and other applications based on the priorities of the applications contained in the latest version of configuration information, comprises:

identifying an application whose switch for screen saver is in an ON state based on the states of the switches for screen saver of the applications in the broadcast information sent by each of the other applications; and     determining whether the first application has the highest priority among the first application and the other applications, whose switches for screen saver are in an ON state, based on the priorities of the applications contained in the latest version of configuration information.

\* \* \* \* \*